No. 830,891. PATENTED SEPT. 11, 1906.
J. M. EDWARDS.
COFFEE ROASTER.
APPLICATION FILED NOV. 14, 1905.
2 SHEETS—SHEET 1.
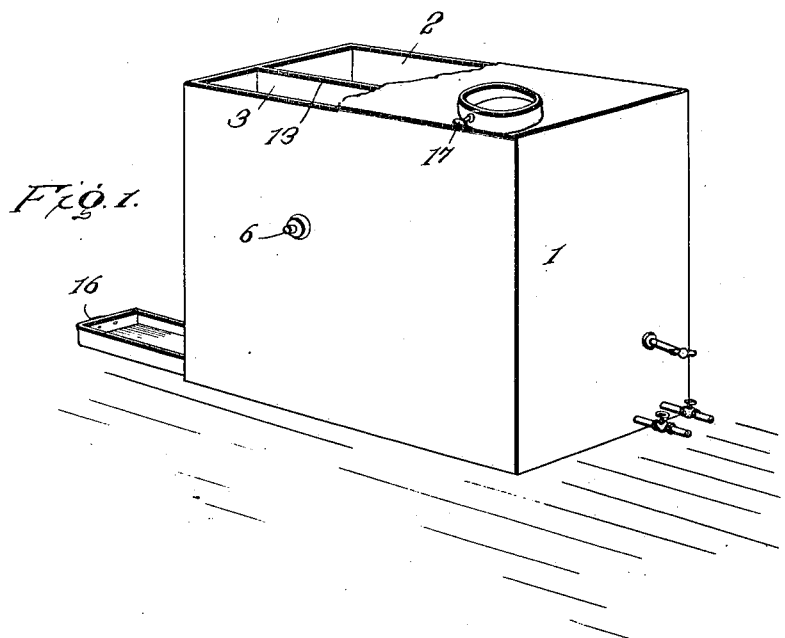
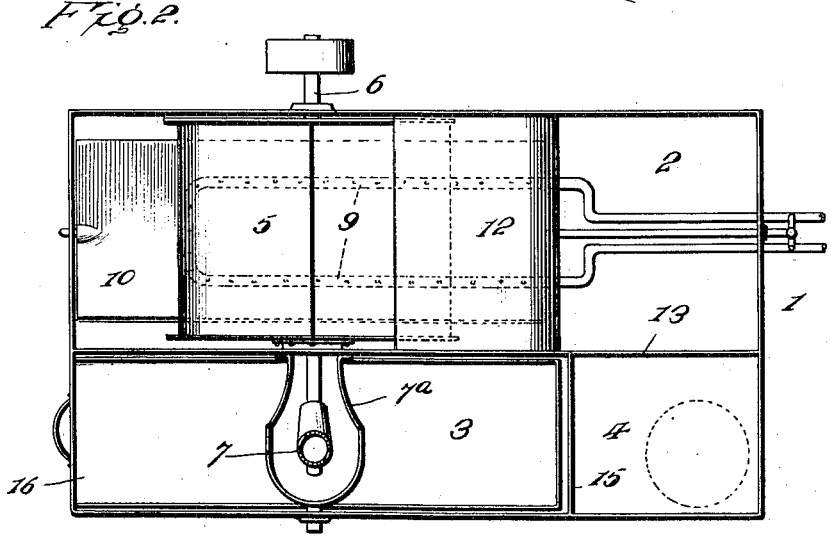
Inventor
J. M. Edwards.
Witnesses
By
Attorney

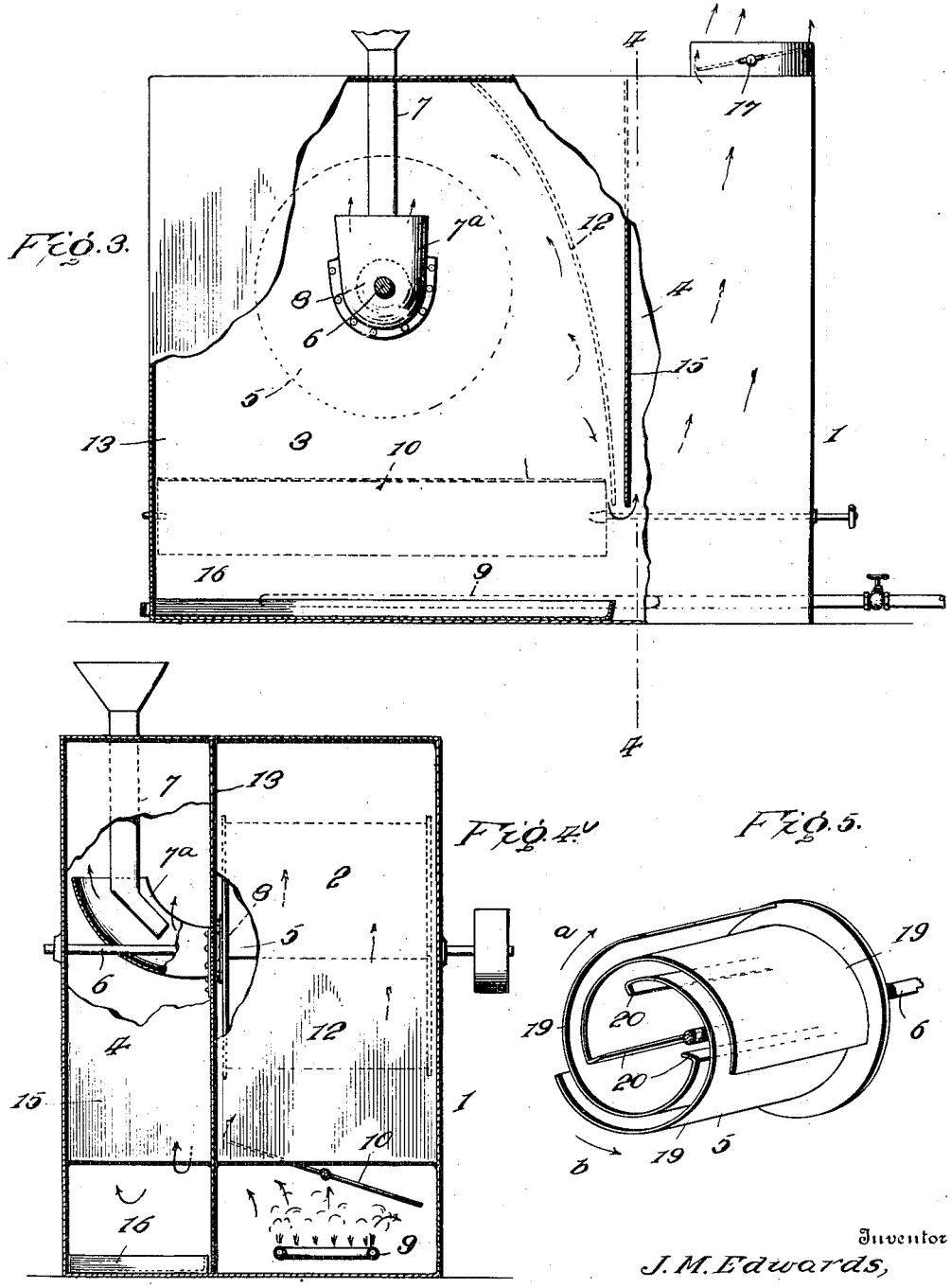

UNITED STATES PATENT OFFICE.

JAMES M. EDWARDS, OF MORRIS PARK, NEW YORK.

COFFEE-ROASTER.

No. 830,891.

Specification of Letters Patent.

Patented Sept. 11, 1906.

Application filed November 14, 1905. Serial No. 287,303.

*To all whom it may concern:*

Be it known that I, JAMES M. EDWARDS, of Morris Park, in the county of Queens and State of New York, have invented certain new and useful Improvements in Coffee-Roasters; and I do hereby declare the following to be a full, clear, and exact description of the invention, such as will enable others skilled in the art to which it appertains to make and use the same.

This invention relates to that class of roasters employing a rotary cylinder designed to contain the coffee or other grain, such cylinder being arranged within a housing and above the fire, so that the heat will contact with its outer surface. In roasters of this description as previously constructed difficulty was found in creating sufficient circulation of the heated air through the cylinder and the mass of grain therein. This difficulty was partly overcome by the employment of cylinders of wire mesh with passages formed by tubes of the same material extending through the cylinder. In other forms of roasters the heated air has been introduced into the cylinder at its end. In all of the roasters as heretofore constructed, however, and even in those having sufficient draft the difficulties encountered were that the grain was detrimentally affected by the flame and likewise by the smoke arising from burning chaff, while the chaff itself and the dust were either permitted to escape or the means designed to control them tended to retard the draft.

The object of my invention is to provide a roaster in which the grain is treated by the action of heat at such a point away from the combustion that the products thereof may entrain sufficient pure air before coming in contact with the grain.

A further object is to provide a course of direction for the heat which will carry away from the material being treated the chaff and dust separated from the grain and permit of their collection, so as to avoid or lessen escape through the chimney.

A further object is to avoid burning or smoldering chaff remaining in the grain and affecting its active principles, and a further object is to provide an improved form of rotating cylinder.

In the accompanying drawings, Figure 1 is a perspective view, partly broken away, showing a roaster embodying my invention. Fig. 2 is a top plan view with the cover removed. Fig. 3 is a side elevation, partly broken away. Fig. 4 is a section on line 4 4, Fig. 3. Fig. 5 is a view of the cylinder removed.

Referring to the drawings, 1 designates a housing or casing. This is shown formed with three compartments 2 3 4.

5 is the rotary cylinder mounted upon a shaft 6, extending through the housing.

7 is a supply-pipe through which the grain is fed to the cylinder. This is shown vertically disposed in compartment 3 and having its lower end projected into a spout $7^a$, secured to the casing and extending into an opening 8 in the end or head of the cylinder. The compartment 2 is of such height as to provide ample space between the cylinder which is at its top and the burners 9 at the bottom, thus affording opportunity for the products of combustion entraining fresh air before reaching the cylinder. A damper 10 below the cylinder and a curved deflector-plate 12 are designed to regulate and direct the supply of heat to the cylinder. The wall 13 of the casing separates compartment 2 from compartments 3 4, and communication between the cylinder and compartment 3 is established through spout $7^a$.

15 is a wall extending transversely of the housing from one outer wall to the wall 13 and separating compartments 3 4. The only outlet from the cylinder is through the opening 8 and spout $7^a$ to compartment 3. The wall 15 extends well down to near the bottom of the compartments, and below it the two compartments are in communication. At the bottom of compartment 3 is a receptacle 16 for dust and chaff.

From what has thus far been said it will be seen that the line of direction of the draft is upward in compartment 2 into the cylinder, thence to compartment 3, downwardly in this compartment to the chaff-receptacle 16, beneath wall 15 and up through compartment 4, at the top of which latter is a damper 17 for the purpose of regulating the discharge of the heated air according to the nature of the grain being treated. Practice has demonstrated that the single line of direction for the draft, as described, insures the products of combustion emitted from compartment 4 being relatively free from chaff and dirt, nearly all of the latter being collected in the receptacle 16. The possibility of smoldering chaff remaining in the grain is reduced to a minimum, and the grain itself is not detrimentally affected by the flame from the burners.

As an improved form of cylinder I have designed that illustrated in Fig. 5, wherein the body portion of the cylinder 5 is formed by a series of vanes 19, extending longitudinally and secured to the cylinder ends. Any desired number of these vanes may be employed, three being illustrated. They are of such width and disposition that they overlap each other, the overlapping portions being curved inwardly to provide an unobstructed space between the vanes, the latter being out of engagement with each other and supported only by the cylinder ends. At their inner longitudinal edges the vanes are provided with racks 20, shown formed by bending the vanes. The racks are slightly slanted longitudinally, so that they will tend to throw the grain from end to end of the cylinder. When the cylinder as thus constructed is rotated in the direction indicated by the arrow $a$, the grain contained in the cylinder will be as effectively retained as if the body of the latter were formed with a single continuous wall, the grain falling from the rack of one vane onto the vane beneath. At the same time ample opportunity for entrance of the heat is provided by the space between the vanes, while obviously the vanes themselves may be made of wire mesh or other foraminous material, if desired, although I have shown them as of sheet metal, practice having demonstrated that ample circulation of the draft results from that construction. When, however, the cylinder is rotated in the direction indicated by the arrow $b$, the grain or contents will pass out through the unobstructed spaces between the vanes, and thus the cylinder may readily be emptied. This construction avoids the necessity for equipping the cylinder with outlets and controlling means. When the cylinder is to be emptied, a tray or receptacle may be placed above the burners to receive the roasted grain, or an outlet may be formed in the casing and the damper 10 employed as a deflector.

Any heat-producing agency may be employed, such as coal or gas. The particular form of burner, together with a sampling device and cooler for the roasted grain, form no part of the present invention and are not shown or described.

Practice has demonstrated that in the roasting of coffee according to my invention a dry pure heat being employed, the steam generated from the coffee and charged with volatile and aromatic juices acts upon the grain to soften it and loosen the skin or chaff. This steam being by regulation of the draft retained in contact with the grain as long as conditions may require absorbs the dry heat and assumes the properties of a cooking agent, sealing the juices in the coffee-beans, and thus retaining and developing the active principles of the grain. Under some circumstances it may be desirable to conduct the chaff out of compartment 3 before collecting the same. This may readily be done by arranging the receptacle 16 outside of the casing and forming an outlet in the latter suitably controlled to permit the exit of the chaff without affecting the draft.

I claim as my invention—

1. In a roaster, a housing, a compartment therein, a rotary cylinder mounted in said compartment, a second compartment in said housing in communication with said cylinder, an outlet from said second compartment at the bottom thereof, and a flue leading from said outlet to the top of said housing, whereby the line of direction of the draft from said cylinder is downward in said second compartment and upward through said flue, for the purpose stated.

2. In a roaster, a housing having a central wall, a partition extending from one side of said housing to said wall and forming a compartment and a flue in communication with each other, a passage-way being formed in said wall opening into said compartment, and a rotary cylinder having an open end registering with said passage-way, as set forth.

3. In a roaster, a housing having three compartments, a rotary cylinder mounted in one of said compartments, a second compartment, having a receptacle for chaff at the bottom thereof, a passage-way from said cylinder to said second compartment, a third compartment in communication with said second compartment near the bottom of the latter, and an outlet at the top of said third compartment.

4. In a roaster for coffee or other grains, a rotary cylinder having its body portion consisting of overlapping vanes secured at their ends to the cylinder-heads, both of the longitudinal edges and faces of each of said vanes being free intermediate the cylinder-heads to provide unobstructed spaces between said vanes, for the purpose stated.

5. In a roaster for coffee or other grains, a rotary cylinder having its body portion consisting of overlapping vanes, said vanes being bent at their inner edges to form racks, and the several racks slanted longitudinally.

In testimony whereof I have signed this specification in the presence of two subscribing witnesses.

JAMES M. EDWARDS

Witnesses:
GRAFTON L. McGILL,
ALICE LIND.